United States Patent
Greer

(10) Patent No.: US 9,411,580 B2
(45) Date of Patent: *Aug. 9, 2016

(54) ANNOTATING A GENERATOR OUTPUT STREAM

(75) Inventor: Scott B Greer, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 708 days.

This patent is subject to a terminal disclaimer.

(21) Appl. No.: 13/485,359

(22) Filed: May 31, 2012

(65) Prior Publication Data

US 2013/0326326 A1 Dec. 5, 2013

(51) Int. Cl.
*G06F 17/00* (2006.01)
*G06F 9/44* (2006.01)

(52) U.S. Cl.
CPC ........................................ *G06F 8/73* (2013.01)

(58) Field of Classification Search
CPC ......... G06F 17/24; G06F 17/25; G06T 11/60; A63F 2300/5553; A63F 2300/6623
USPC .................................. 715/201, 202, 230, 255
See application file for complete search history.

(56) References Cited

U.S. PATENT DOCUMENTS

| 6,253,370 B1* | 6/2001 | Abadi et al. .................. 717/154 |
| 6,275,981 B1 | 8/2001 | Buzbee et al. |
| 7,174,536 B1* | 2/2007 | Kothari ............... G06F 11/3664 717/105 |
| 2003/0110472 A1* | 6/2003 | Alloing ..................... G06F 8/71 717/122 |
| 2010/0325620 A1* | 12/2010 | Rohde ................ G06F 9/44589 717/154 |

* cited by examiner

*Primary Examiner* — Frank D Mills
*Assistant Examiner* — Jenq-Kang Chu
(74) *Attorney, Agent, or Firm* — Jeffrey T. Holman

(57) ABSTRACT

A code annotating system includes a code wrapper engine, an annotator engine, and a memory device. The code wrapper engine receives an output stream produced by a source code of a generator. The code wrapper engine also wraps the output stream to produce a copy of the output stream. The annotator engine automatically annotates the copy with source information. The source information maps a relationship between data in the output stream and the source code of the generator. The memory device stores the source information.

13 Claims, 5 Drawing Sheets

ANNOTATING A GENERATOR OUTPUT STREAM

BACKGROUND

Software is used to produce complex documents in many different use cases, such as using a source generator whose output is source code in some target language. Other examples include software that produces Portable Document Format (PDF) files, software that generates structured content such as Hypertext Markup Language (HTML) or Extensible Markup Language (XML), utilities that produce reports from various inputs, and utilities that convert from one file format to another. Some graphics-oriented examples include software that produces complex visualizations such as heat maps, or software that algorithmically generates music in standard notation. The generated documents may include text, symbols, and/or graphic elements.

These generators are often complex and include many thousands of lines of code, and thus may be difficult to develop, debug, and maintain. Developers working on such applications may require lengthy training and familiarization, resulting in low productivity, even while relying on more experienced developers and test automation. For commercial applications, this may create a very small pool of talent that must be nurtured and about whom retention may be a constant concern. For open source applications, this creates a serious impediment to the application's ability to attract developer interest and generate momentum.

SUMMARY

Embodiments of a system are described. In one embodiment, the system is a code annotating system. The system includes: a data storage device configured to: store a table having data values in a column major order, wherein the data values are stored in a list of blocks; and a table management engine configured to: a code wrapper engine configured to: receive an output stream produced by a source code of a generator; and wrap the output stream to produce a copy of the output stream; an annotator engine configured to: automatically annotate the copy with source information, wherein the source information maps a relationship between data in the output stream and the source code of the generator; and a memory device configured to store the source information. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
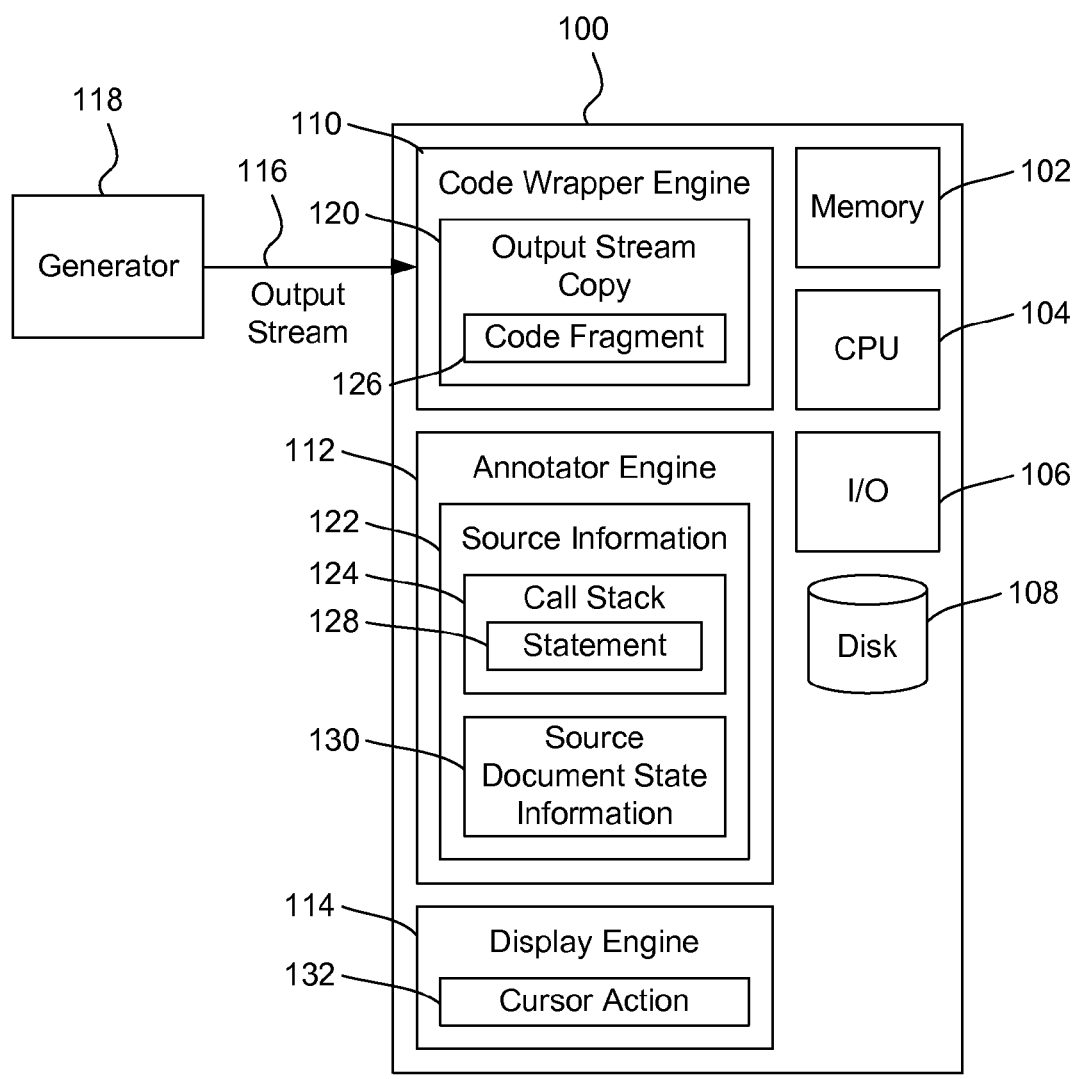
FIG. 1 depicts a schematic diagram of one embodiment of a code annotating system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for annotating document source code in an output stream of a generator. More specifically, the system generates a copy of the output stream to generate an annotated output document that describes relationships between code fragments in the output stream and statements 128 in a source code of the generator. The statements 128 related to a given code fragment may be displayed in a call stack or call graph on a display device when the code fragment is highlighted to show the call order that created the given code fragment.

Some conventional systems may require developers to use a debugger to step through a generator's complex source code to pinpoint any problems that may be discovered. Other conventional systems may include implementing the generator's source code with trace information for noting where problems or potential problems are occurring. Correcting problems in such conventional systems may be time consuming and error prone, which can lower productivity. In some systems, formal grammars may be created that define the generator's input and output, and possibly validate the generator's output by analyzing the input and output grammars. In practice, this can be problematic because it requires very highly specialized skills to create these grammars and can be very costly to maintain.

A system for generating an annotated output document that maps the code fragments in the output document to statements in the generator source code may provide a quick, easy way to analyze and correct the generator source code. Automatically annotating the output stream of the generator may also improve developer productivity and expedite the "time-to-value" of developers who are new to the generator codebase. Developers may take an incremental, outside-in approach to learning the codebase by focusing on what the generator produces rather than having to internalize its architecture and the architecture of the data with which the generator works. Furthermore, automating the system allows the generator to evolve over time, such that the generator logic may be freely changed, and the annotation mechanism may still augment the generator source code.

Figure 5:
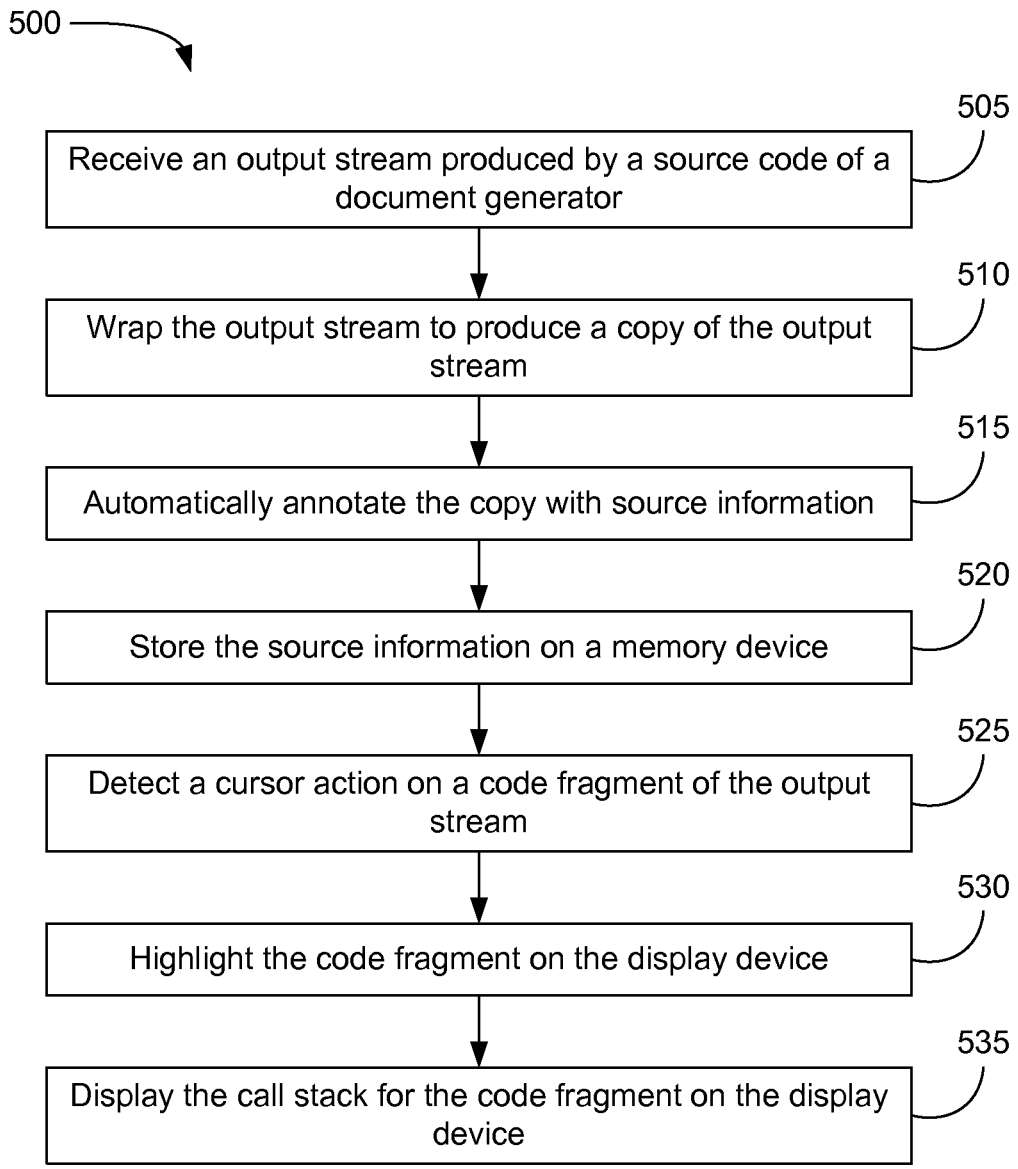
FIG. 5 depicts one embodiment of a method for annotating document source code.

FIG. 1 depicts a schematic diagram of one embodiment of a code annotating system. The depicted code annotating system 100 includes various components, described in more detail below, that are capable of performing the functions and operations described herein. In one embodiment, at least some of the components of the code annotating system 100 are implemented in a computer system. For example, the functionality of one or more components of the code annotating system 100 may be implemented by computer program instructions stored on a computer memory device 102 and executed by a processing device 104 such as a CPU. The code annotating system 100 may include other components, such as a disk storage drive 108, input/output devices 106, a code wrapper engine 110, an annotator engine 112, and a display engine 114. Some or all of the components of the code annotating system 100 may be stored on a single computing device or on a network of computing devices, including a wireless communication network. The code annotating system 100 may include more or fewer components or subsystems than those depicted herein. In some embodiments, the code annotating system 100 may be used to implement the methods described herein as depicted in FIG. 5.

In one embodiment, the code annotating system 100 receives the output stream 116 of a generator 118. In one embodiment, the generator 118 is a specialized generator 118 configured to convert the source document from a source coding language to a target coding language. Because converting documents from one coding language to another requires mapping each of the statements 128 and subroutines between the source and target coding languages, the source code of the generator 118 may have thousands of lines of coding. Alternative embodiments of generators 118 may produce other types of output streams 116 and complex documents, such as vector graphics, and thus may also require many lines of source code.

The code wrapper engine 110 wraps the output stream 116 to create a copy 120 of the output stream 116. In one embodiment, wrapping the output stream 116 may be optionally enabled. For example, wrapping the output stream 116 may be enabled only during development of the generator and generally disabled in actual production use. Disabling wrapping during use may allow the generator 118 to operate faster than if wrapping is enabled. The annotator engine 112 annotates the output stream copy 120 with source information 122 that includes a relationship between the output stream 116 and the source code of the generator 118. This may be achieved by collecting and analyzing a call stack 124 associated with each code fragment 126 in the output stream 116, and filtering the call stack 124 to augment the copy 120 with annotations about how the content in the copy 120 was produced. The call stack 124 contains statements 128 from the source code that, in combination, produce a specific code fragment 126 in the output stream 116. Any output emitted anywhere within the generator 118 may be automatically annotated.

In some embodiments, the annotator engine 112 also annotates the output stream copy 120 with additional state information 130 that corresponds to a source document that is input into an input stream of the generator 118. In some embodiments, the annotator engine 112 annotates the output stream copy 120 only with information from the source code that is semantically relevant to the output stream 116 and excludes any information from the generator 118 that does not emit content.

In one embodiment, the display engine 114 is configured to display the call stack 124 for a code fragment 126 on an output device 106 such as a display device when the user performs a cursor action 132 on the code fragment 126. The call stack 124 may be displayed in a popup window or dialog proximate the cursor or the highlighted code fragment 126 on the display device in some embodiments. In one embodiment, the call stack 124 is displayed in a call order in which each statement 128 or subroutine that is called to produce the code fragment 126 is displayed in the order in which it is called. The statements 128 may be annotated with the corresponding line numbers from the source code, allowing a developer inspecting the annotations to quickly find the statements 128 in the source code for debugging or other purposes. This provides a very natural workflow by allowing the developer to run the generator 118 and look at the resulting documents with overlays illustrating the captured annotations.

Figure 2:
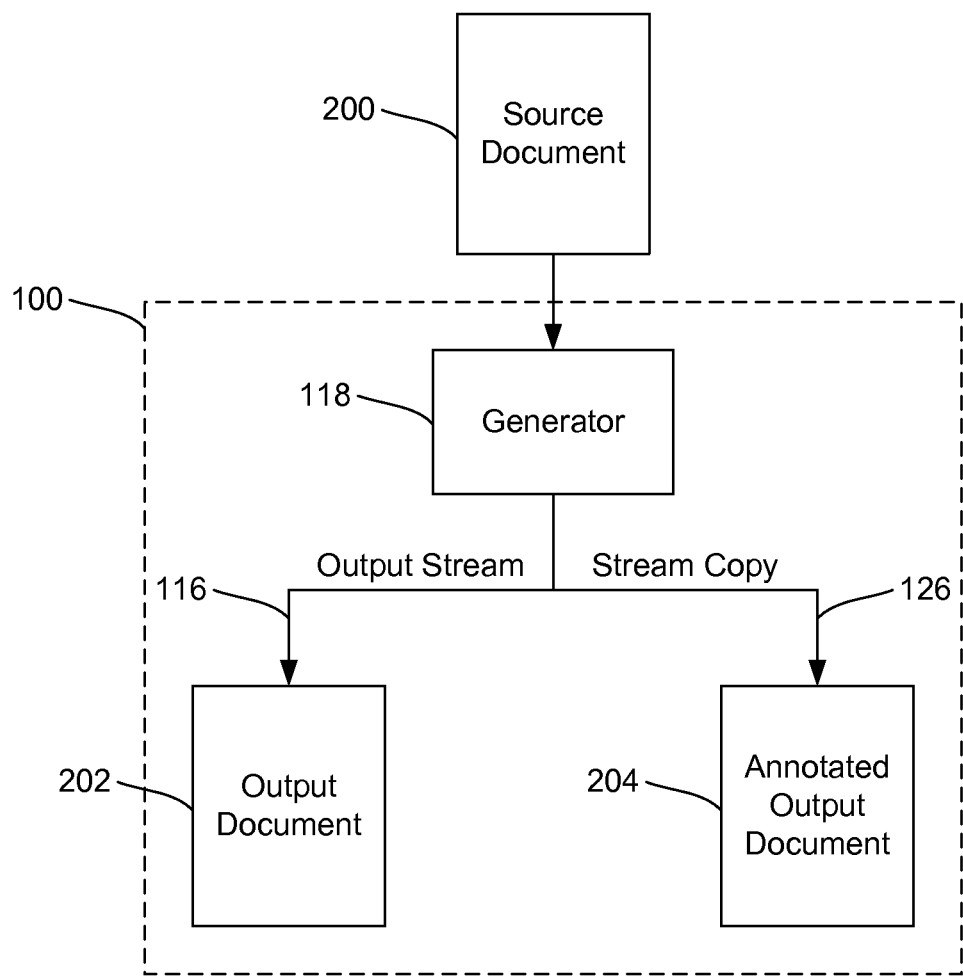
FIG. 2 depicts a schematic diagram of one embodiment of the code annotating system of FIG. 1.

FIG. 2 depicts a schematic diagram of one embodiment of the code annotating system 100 of FIG. 1. In one embodiment, the code annotating system 100 includes a generator 118 that receives an input from a source document 200 or other input source. For example, the source document 200 may be a document containing code from a source coding language that is to be converted into a target coding language.

The source document 200 is input into an input stream of the generator 118. In some embodiments, the generator 118 may accept multiple source documents 200 that contain code written in the same source coding language. The generator 118 may include source code configured specifically for the source coding language in the source documents 200. The generator source code may be configured to convert the code from the source document 200 into the target coding language through numerous processes or subroutines. Because the generator source code may be required to map any potential subroutines, objects, or other elements in the source coding language to the target coding language, the generator source code may have many lines of code and be very complex.

In one embodiment, the generator source code converts the source document 200 into the target coding language and outputs the converted code into an output stream 116 that is written to one or more output documents 200. The code annotating system 100 intercepts the output stream 116 and wraps the output stream 116 to create a stream copy 120. The stream copy 120 may then be annotated by the code annotating system 100 to create an annotated output document 204. In one embodiment, the annotated output document 204 includes all of the data from the output stream 116, plus all of the annotations added in the stream copy 120. The annotated output document 204 may be linked to the output document 200, such that the annotated output document 204 is able to use data from the output document 200 that may not be contained in the annotated output document 204.

Figure 3:
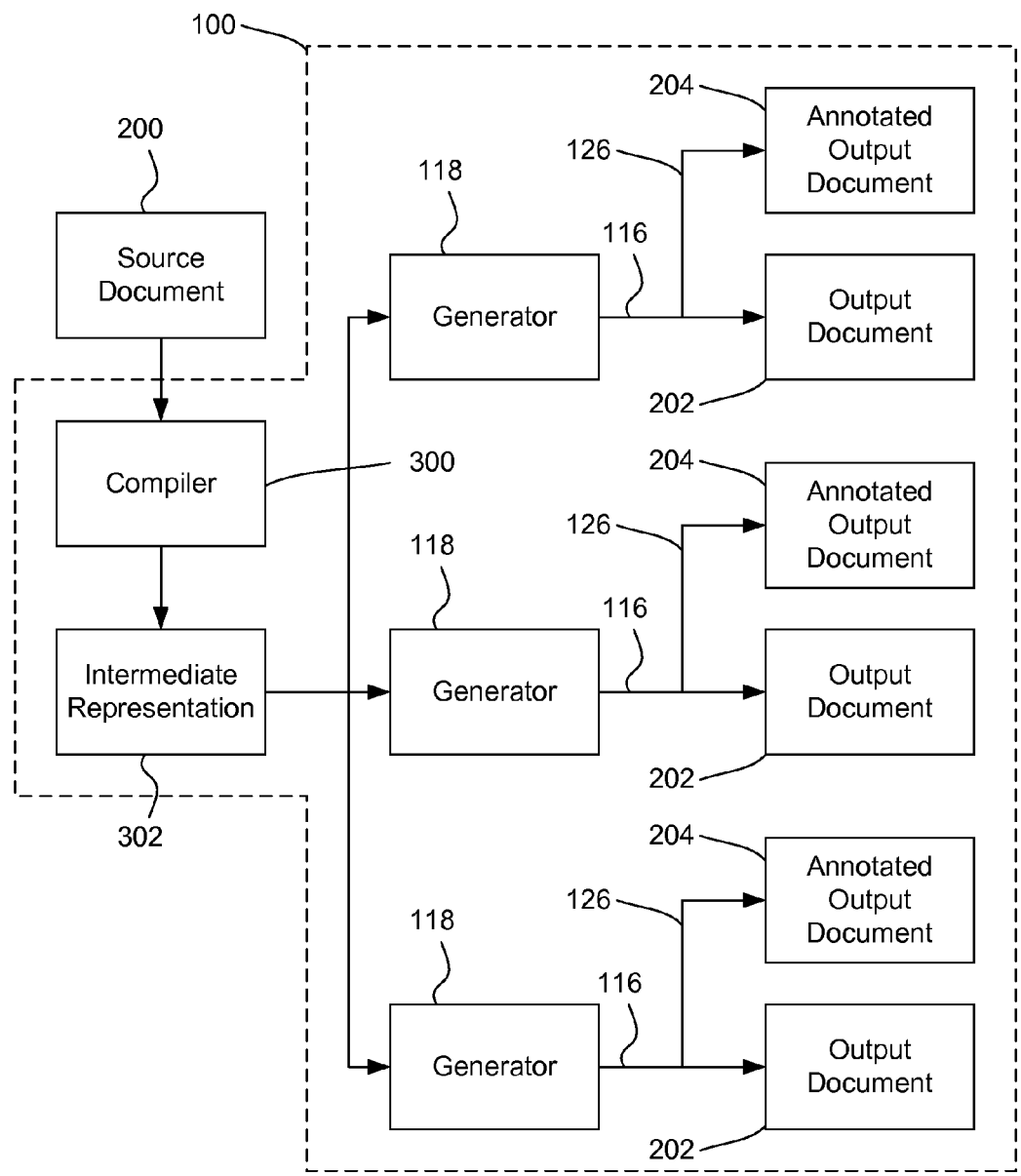
FIG. 3 depicts a schematic diagram of one embodiment of the code annotating system of FIG. 1.

FIG. 3 depicts a schematic diagram of one embodiment of the code annotating system 100 of FIG. 1. The code annotating system 100 may include components in addition to the generator 118 and output streams 116. In some embodiments, the code annotating system 100 includes components or processing stages between the source document 200 and the generator 118. The code annotating system 100 may also include more than one generator 118, each having an output stream 116 and an output stream copy 120. Each generator 118 may be configured to convert the source document 200 into a different target coding language or into a different kind of output document 200, depending on the implementation of the generator 118.

In one embodiment, the source document 200 is input into a compiler 300 to compile the code in the source document 200 into an intermediate representation 302 of the source document 200. The compiler 300 may translate the code from the source coding language, which may be a high-level programming language, to a lower level programming language, such as assembly language or machine code. In some embodiments, the code annotating system 100 may perform additional processes on the code in the intermediate representation 302.

The intermediate representation 302 may then be input into an input stream of each generator 118 to be converted into the respective target coding languages associated with the generators 118. Each generator 118 produces an output stream 116 configured that may be used to produce an output document 200 or to display on a display device. The code annotating system 100 wraps each output stream 116 produced by the generators 118 and creates corresponding stream copies for inserting and displaying annotations. The annotations may describe a relationship between the data in the output streams 116 and the corresponding source code of the generators 118.

In some embodiments, the code annotating system 100 may include more than one compiler 300 configured to compile more than one source document 200. The compilers 300 may be configured to compile code for different source coding languages corresponding to the different source documents 200. The compilers 300 may then output each of the source documents 200 as intermediate representations 302. The intermediate representations 302 may then be input into the generators 118 to convert the intermediate representations 302 into the corresponding target coding languages. Information from the intermediate representations 302 may also be part of the annotations. This may allow developers who own the intermediate representations 302 and the source that produces the intermediate representations 302 to find and fix errors. This may also allow developers to ensure that the generator 118 is receiving the proper inputs and producing the correct outputs for the corresponding inputs. In various embodiments of the code annotating system 100, the code annotating system 100 may include more or fewer components than described herein. Processes or alterations other than those described herein may be made to the data from the source document 200 or to data input into the generators 118.

Figure 4:
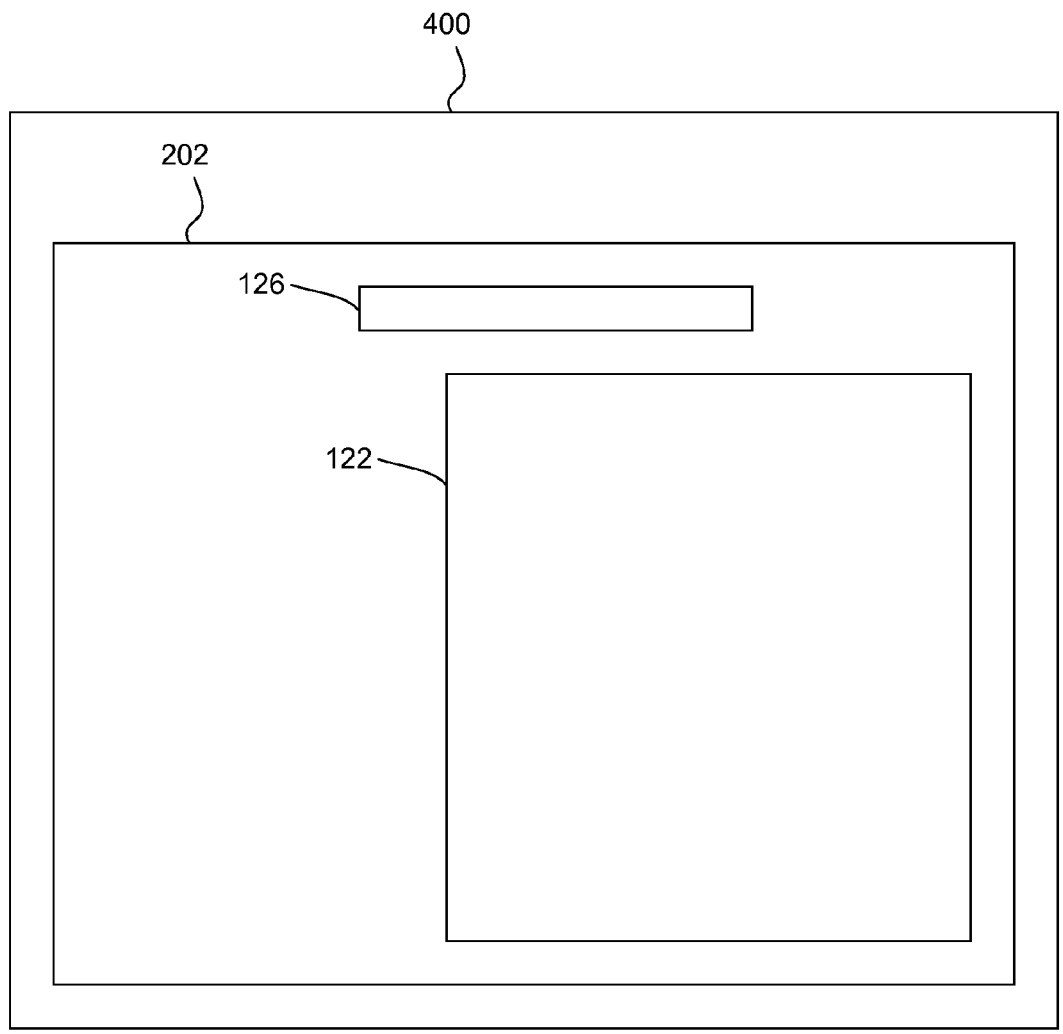
FIG. 4 depicts a schematic diagram of one embodiment of an annotated output document.

FIG. 4 depicts a schematic diagram of one embodiment of an annotated output document 204. While the code annotating system 100 is described herein in conjunction with the annotated output document 204 of FIG. 4, the code annotating system 100 may be used in conjunction with any annotated output document 204 or user interface for displaying code annotations.

In one embodiment, the annotated output document 204 is displayed on a display device 400 that is viewable to a user such as a developer. This may allow the user to view the output document 200 or output stream 116 produced by the generator source code and to analyze the code in the target coding language. The code annotating system 100 also inserts source information into the output stream 116 so that the user is able to view relationships between data in the output stream 116 and data in the generator source code.

In one embodiment, the output document 200 is displayed in an interactive format on the display device 400 that allows the user to scroll through the code and select individual code fragments 126. When the user selects a code fragment 126 via a cursor action 132, such as a mouse over event or mouse click event on the code fragment 126, the code fragment 126 may be highlighted on the display device 400. The code annotating system 100 also displays any annotations corresponding to the selected code fragment 126 on the display device 400. The annotations may be displayed anywhere on the display device 400. For example, the annotations may be displayed proximate the code fragment 126 in a popup dialog window. The annotations include source information 122 from the generator source code.

In one embodiment, the source information 122 includes a call stack 124 that displays statements 128 from the generator source code relating to the selected code fragment 126 from the output stream 116. The statements 128 in the call stack 124 may be displayed in a call order or a reverse call order to allow the user to easily trace through the statements 128 or subroutines that were called to produce the selected code fragment 126. The call stack 124 may also display the line numbers for the statements 128 in the call stack 124 corresponding to the location of the statements 128 in the generator source code. The user may be able to use the line numbers to find the statements 128 in the generator source code and modify or correct the source code if the user determines that the output stream 116 has errors. The annotations help the user understand the high-level flow within the generator 118 for each produced code segment.

FIG. 5 depicts one embodiment of a method 500 for annotating document source code. Although the method 500 is described in conjunction with the code annotating system 100 of FIG. 1, embodiments of the method 500 may be implemented with other types of code annotating systems 100.

In one embodiment, the code annotating system 100 or a component in the code annotating system 100 receives 505 an output stream 116 produced by the source code of the generator 118. The system wraps 510 the output stream 116 to produce a copy 120 of the output stream 116. The system automatically annotates 515 the copy 120 with source information 122, which maps a relationship between data in the output stream 116 and the generator source code. The source information 122 is stored 520 on a memory device 102.

In one embodiment, the system annotates the stream copy 120 with the source information 122 by only including information from the generator source code that is semantically relevant to the output stream 116. The generator source code may include functions or subroutines that perform processes internal to the generator 118 and that do not have an effect on content in the output stream 116. Examples of such functions include utility and infrastructure functions that do not contribute meaningfully to the understanding of the output stream 116. Excluding such data from the source information 122 helps provide clear annotations in the output stream 116.

In one embodiment, the system also captures additional state information 130 corresponding to a source document 200 that is input into the generator 118 at an input stream and is used by the generator 118 to derive the content in the output stream 116. The output stream 116 is annotated with the additional state information 130. Information relating to the source document 200 may help understand the processes performed by the generator 118 to produce the data in the output stream 116. Any input streams into the generator 118 may be wrapped such that the annotation information can capture the fragment 126 of the input stream associated with one or more output fragments 126. The fragment 126 of the input stream may be automatically annotated to the copy 120 of the output stream 116. In other embodiments, the generator 118 may react to data structures (rather than streams). In such embodiments, the arguments to the functions of the generator 118 may be captured by overriding method invocation at a common point (as may be the case in some architectures) or by using aspect-oriented technology. Whether the generator 118 is stream- or data-oriented, once the input information is captured, the input information may be incorporated into the source information 122 associated with the emitted code fragment 126.

In some embodiments, the source information 122 includes a call stack 124 that contains each statement 128 from the generator source code that corresponds to a code fragment 126 in the output stream 116. When the system detects 525 a cursor action 132 on the code fragment 126 in the output stream 116, the code fragment 126 is highlighted 530 on the display device 400. The source information 122 is then displayed on the display device 400. Displaying the source information 122 may include displaying 535 the call stack 124 that includes a line number for each statement 128 from the source code. The call stack 124 may be displayed in a call order or a reverse call order so that the user may easily track the series of calls that produce the highlighted code fragment 126. In another embodiment, the source information 122 is displayed in a call graph that represents the relationships between subroutines in the source code.

In one example of the system, the programming context includes a language that supports an ability to obtain a full stack trace at any point during execution. This ability may be leveraged to varying degrees in contexts that support a similar runtime reflection. By wrapping the output stream 116 and overriding the functions that produce output, callers to such functions are inherently the portions of the generator 118 that emit content. This allows for automated annotation without requiring any specific annotation logic in the generator 118.

Several different techniques for identifying the generator's calling function may be used. One example includes wrapping all of the methods in the output stream 116 and incrementing a counter that tracks the stack depth. This may ensure that the non-relevant calls are filtered out even if the wrapped stream invokes some of its own methods. Another example includes walking the stack trace to find the first entry not associated with the wrapped output stream 116 or its base class. Another approach includes analyzing the full stack trace with one or more inclusive or exclusive criteria for filtering the full stack trace. For example, the logic for the generator 118 may all be associated with a certain package prefix, particularly if the wrapped output stream 116 invokes some of its own methods. The name, function, and line number may be collected for each stack entry that is determined to be relevant. This information may be associated with the code fragment 126 that is being output at that time.

After collecting the annotation information, the system presents the annotations to the developer. There are many potential embodiments to address different use cases, but each embodiment may share some common characteristics. First, the system may be designed to associate each fragment 126 of generated content with the generator source that emitted the fragment 126 and to augment the association with a meaningful stack trace so that the user is able to understand the high-level flow within the generator 118 at that point. As a result, various embodiments may provide some means of identifying a generated fragment 126, displaying the precise source location that emitted the fragment 126, and displaying the filtered stack trace using some means of representation.

An embodiment of a code annotating system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to annotate document source code produced by a generator 118.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
   a non-transitory computer readable storage medium to store a computer readable program, wherein the computer readable program, when executed by a processor within a computer, causes the computer to perform operations for annotating document source code, the operations comprising:
   receiving an output stream of target coding language converted from source code input into a generator;
   wrapping the output stream to produce a stream copy of the output stream, and producing an output document from the output stream; and
   automatically annotating the stream copy with source information to create an annotated output document by:
   collecting a call stack associated with a code fragment in the output stream;
   analyzing the call stack by excluding any information that does not emit content in the target coding language; and
   annotating the stream copy with the analyzed call stack, wherein the source information maps a relationship between the code fragment in the annotated output document and the source code, wherein the code fragment is present in both the output document and the annotated output document.

2. The computer program product of claim 1, wherein the call stack comprises each statement from the source code that corresponds to the code fragment in the annotated output document.

3. The computer program product of claim 2, wherein the computer readable program, when executed on the computer, causes the computer to perform additional operations, comprising:
   detecting a cursor action on the code fragment in the annotated output document;
   highlighting the code fragment on a display device; and
   displaying the source information on the display device in response to detecting the cursor action on the code fragment in the annotated output document.

4. The computer program product of claim 3, wherein displaying the source information further comprises displaying the call stack, wherein the call stack further comprises a line number for each statement from the source code, wherein the call stack is displayed in a reverse call order.

5. The computer program product of claim 2, wherein the computer readable program, when executed on the computer, causes the computer to perform additional operations, comprising:
   wrapping an input stream to the generator;
   capturing a code fragment of the input stream associated with the code fragment in the output stream; and
   automatically annotating the copy of the output stream with the code fragment of the input stream.

6. The computer program product of claim 1, wherein annotating the copy with the source information further comprises including only information from the source code that is semantically relevant to the output stream by filtering the call stack prior to annotating the stream copy with the source information.

7. The computer program product of claim 1, wherein the computer readable program, when executed on the computer, causes the computer to perform additional operations, comprising:
   receiving a source document into the generator at an input stream;
   capturing a code fragment of the input stream associated with the code fragment in the annotated output document;
   capturing additional state information corresponding to the source document, wherein the source document is input into the generator at the input stream;
   filtering the call stack prior to automatically annotating the stream copy with the source information; and
   annotating the stream copy of the output stream with the additional state information.

8. A code annotating system, comprising:
   a code wrapper engine configured to:
   receive an output stream produced of target coding language converted from source code input into a generator; and
   wrap the output stream to produce a stream copy of the output stream, and produce an output document from the output stream;
   an annotator engine configured to:
   automatically annotate the stream copy with source information to create an annotated output document by:
   collecting a call stack associated with a code fragment in the output stream;
   analyzing the call stack by excluding any information that does not emit content in the target coding language; and
   annotating the stream copy with the analyzed call stack, wherein the source information maps a relationship between the code fragment in the annotated output document and the source code, wherein the code fragment is present in both the output document and the annotated output document; and
   a memory device comprising a non-transitory storage device configured to store the source information.

9. The system of claim 8, wherein the call stack comprises each statement from the source code that corresponds to the code fragment in the annotated output document.

10. The system of claim 9, further comprising a display engine configured to:
    detect a cursor action on the code fragment in the annotated output document;
    highlight the code fragment on a display device; and display the source information on the display device in response to detecting the cursor action on the code fragment in the annotated output document.

11. The system of claim 10, wherein displaying the source information further comprises displaying the call stack, wherein the call stack further comprises a line number for each statement from the source code, wherein the call stack is displayed in a call order.

12. The system of claim 8, wherein annotating the copy with the source information further comprises including only information from the source code that is semantically relevant to the output stream by filtering the call stack prior to annotating the stream copy with the source information.

13. The system of claim 8, wherein the annotator engine is further configured to:
  receive a source document into the generator at an input stream;
  capture a code fragment of the input stream associated with the code fragment in the output stream;
  capture additional state information corresponding to the source document, wherein the source document is input into the generator at the input stream;
  filter the call stack prior to the annotation of the stream copy with the source information; and
  annotate the copy of the output stream with the additional state information.

* * * * *